(12) United States Patent
Nishiki et al.

(10) Patent No.: US 12,093,024 B2
(45) Date of Patent: Sep. 17, 2024

(54) OPERATION EVALUATION DEVICE, OPERATION EVALUATION METHOD, AND PROGRAM

(71) Applicant: MITSUBISHI HEAVY INDUSTRIES, LTD., Tokyo (JP)

(72) Inventors: Hisashi Nishiki, Tokyo (JP); Tomoyuki Enomoto, Tokyo (JP); Hikaru Sawada, Komaki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 413 days.

(21) Appl. No.: 17/432,592

(22) PCT Filed: Feb. 7, 2020

(86) PCT No.: PCT/JP2020/004710
§ 371 (c)(1),
(2) Date: Aug. 20, 2021

(87) PCT Pub. No.: WO2020/175084
PCT Pub. Date: Sep. 3, 2020

(65) Prior Publication Data
US 2022/0121182 A1     Apr. 21, 2022

(30) Foreign Application Priority Data
Feb. 26, 2019   (JP) .................. 2019-033275

(51) Int. Cl.
G05B 19/418     (2006.01)
G06Q 50/04      (2012.01)

(52) U.S. Cl.
CPC ....... *G05B 19/41885* (2013.01); *G06Q 50/04* (2013.01); *G05B 2219/43112* (2013.01)

(58) Field of Classification Search
None
See application file for complete search history.

(56) References Cited

U.S. PATENT DOCUMENTS 5,740,065 A * 4/1998 Jang .................. G03F 7/70633
                                                    700/121
6,510,419 B1 * 1/2003 Gatto .................... G06Q 40/04
                                                    705/37

(Continued)

FOREIGN PATENT DOCUMENTS

CN   101753364 B   8/2012
CN   104142679 B   3/2017

(Continued)

OTHER PUBLICATIONS

International Search Report dated Mar. 24, 2020, issued in counterpart Application No. PCT/JP2020/004710, with machine translation. (4 pages).

(Continued)

*Primary Examiner* — Jason Lin
(74) *Attorney, Agent, or Firm* — WHDA, LLP

(57) ABSTRACT

An evaluation value prediction unit predicts an evaluation value at a time point after a given time passes from a predetermined evaluation time based on input data related to an operation of a factory at the evaluation time using a learned prediction model. The prediction model is a learned model that is learned so that the evaluation value related to the operation of the factory at a time point after the given time passes from one time point is output by inputting a plurality of kinds of data related to the operation of the factory at one time point. An evaluation value output unit outputs information related to the evaluation value.

5 Claims, 9 Drawing Sheets

(56) References Cited

U.S. PATENT DOCUMENTS

| | | | | |
|---|---|---|---|---|
| 6,610,550 | B1* | 8/2003 | Pasadyn | H01L 22/20 |
| | | | | 438/15 |
| 8,209,218 | B1* | 6/2012 | Basu | G06Q 10/0637 |
| | | | | 705/7.38 |
| 8,612,864 | B2* | 12/2013 | Moyne | G06F 3/0482 |
| | | | | 715/764 |
| 9,564,757 | B2* | 2/2017 | Wang | H02J 3/32 |
| 10,860,931 | B1* | 12/2020 | Venter | G06N 5/02 |
| 2003/0229410 | A1* | 12/2003 | Smith | H01L 21/3212 |
| | | | | 700/109 |
| 2006/0178762 | A1 | 8/2006 | Wroblewski et al. | |
| 2007/0106550 | A1* | 5/2007 | Umblijs | G06Q 30/02 |
| | | | | 705/7.29 |
| 2007/0282766 | A1* | 12/2007 | Hartman | G06N 20/10 |
| | | | | 706/15 |
| 2009/0143873 | A1* | 6/2009 | Navratil | G05B 17/02 |
| | | | | 700/29 |
| 2009/0216348 | A1* | 8/2009 | Moyne | G05B 13/048 |
| | | | | 700/31 |
| 2012/0290879 | A1 | 11/2012 | Shibuya et al. | |
| 2015/0371134 | A1 | 12/2015 | Chien et al. | |
| 2017/0003667 | A1 | 1/2017 | Nakabayashi et al. | |
| 2018/0046149 | A1 | 2/2018 | Ahmed | |
| 2019/0369503 | A1* | 12/2019 | Ypma | G05B 19/41875 |
| 2020/0058081 | A1 | 2/2020 | Saneyoshi et al. | |

FOREIGN PATENT DOCUMENTS

| | | |
|---|---|---|
| CN | 105811402 B | 3/2018 |
| CN | 107832975 A | 3/2018 |
| EP | 2801942 A1 | 11/2014 |
| JP | 2010-15207 A | 1/2010 |
| JP | 2017-16509 A | 1/2017 |
| JP | 2018-173837 A | 11/2018 |
| TW | 201042571 A1 | 12/2010 |
| WO | 2011/024382 A1 | 3/2011 |
| WO | 2018/079778 A1 | 5/2018 |

OTHER PUBLICATIONS

Written Opinion dated Mar. 24, 2020, issued in counterpart Application No. PCT/JP2020/004710, with machine translation. (6 pages).

* cited by examiner

OPERATION EVALUATION DEVICE, OPERATION EVALUATION METHOD, AND PROGRAM

TECHNICAL FIELD

The present invention relates to an operation valuation device, an operation evaluation method, and a program.

Priority is claimed on Japanese Patent Application No. 2019-033275, filed Feb. 26, 2019, the content of which is incorporated herein by reference.

BACKGROUND ART

Patent Literature 1 discloses a technology for monitoring a state of a monitoring target based on monitoring data of the monitoring target and estimating cost occurring due to abnormality.

CITATION LIST

Patent Literature

Patent Literature 1
Japanese Unexamined Patent Application, First Publication No. 2017-16509

DISCLOSURE INVENTION

Technical Problem

Incidentally, in evaluation of an operation of a factory, key performance indicators (KPIs) are used in some cases. When the operation is evaluated with reference to the KPIs, the operation is evaluated by comparing calculated values of the KPIs based on achievements and plan values of the KPIs. However, when the plan values are compared with the achievement values, a countermeasure is taken after a considerable deviation occurs between the plan values and the achievement values of KPI. Therefore, restoration of an operation plan may be late.

An objective of the present invention is to provide an operation evaluation device, an operation evaluation method, and a program capable of predicting an evaluation value related to a future operation when a factory is operated.

Solution to Problem

According to a first aspect of the present invention, an operation evaluation device includes: an evaluation value prediction unit configured to predict an evaluation value related to an operation of a factory at a time point after a given time passes from a predetermined evaluation time based on input data related to the operation of the factory at the evaluation time using a prediction model which is a learned model learned so that the evaluation value at a time point after the given time passes from one time point is output by inputting a plurality of kinds of data related to the operation of the factory at the one time point; an evaluation value output unit configured to output information related to the evaluation value.

According to a second aspect of the present invention, in the operation evaluation device according to the first aspect, the input data may include data related to a running ratio of a facility of the factory and energy consumption of the facility.

According to a third aspect of the present invention, in the operation evaluation device according to the first or second aspect, the prediction model may output, as the evaluation value, an energy evaluation value related to energy consumption of the factory and a running ratio evaluation value related to a running ratio of the factory.

According to a fourth aspect of the present invention, the operation evaluation device according to the third aspect may further include an overall evaluation unit configured to, based on the energy evaluation value and the running ratio evaluation value, calculate an overall evaluation value that is higher as the energy consumption is lower and is higher as the running ratio is higher, or is lower as the energy consumption is lower and is lower as the running ratio is higher. The evaluation value output unit may output the energy evaluation value, the running ratio evaluation value, and the overall evaluation value.

According to a fifth aspect of the present invention, the operation evaluation device according to any one of the first to fourth aspects may further include an importance specifying unit configured to specify importance by a kind of the input data in the prediction model. The evaluation value output unit may output the importance by the kind of input data.

According to a sixth aspect of the present invention, in the operation evaluation device according to the fifth aspect, the importance specifying unit may specify the importance in a case where the prediction model is updated. The evaluation value output unit may output time-series importance by the kind of input data.

According to a seventh aspect of the present invention, the operation evaluation device according to any one of the first to sixth aspects may further include: a changing unit configured to accept a change in a value of the input data; and a simulation unit configured to predict a changed evaluation value which is the evaluation value at the time point after the given time passes from the evaluation time based on the changed data using the prediction model. The evaluation value output unit may output information related to the changed evaluation value.

According to an eighth aspect of the present invention, an operation evaluation method includes: predicting an evaluation value related to an operation of a factory at a time point after a given time passes from a predetermined evaluation time based on input data related to the operation of the factory at the evaluation time using a prediction model which is a learned model learned so that the evaluation value at a time point after the given time passes from one time point is output by inputting a plurality of kinds of data related to the operation of the factory at one time point; and outputting information related to the evaluation value.

According to a ninth aspect of the present invention, a program causes a computer to perform: predicting an evaluation value related to an operation of a factory at a time point after a given time passes from a predetermined evaluation time based on input data related to the operation of the factory at the evaluation time using a prediction model which is a learned model learned so that the evaluation value at a time point after the given time passes from one time point is output by inputting a plurality of kinds of data related to the operation of the factory at one time point; and outputting information related to an evaluation value.

Advantageous Effects of Invention

According to at least one of the aspects, a factory evaluation device can predict evaluation values related to a future operation of a factory.

DESCRIPTION OF EMBODIMENTS

First Embodiment

Factory Evaluation System

Hereafter, embodiments will be described in detail with reference to the drawings.

Figure 1:
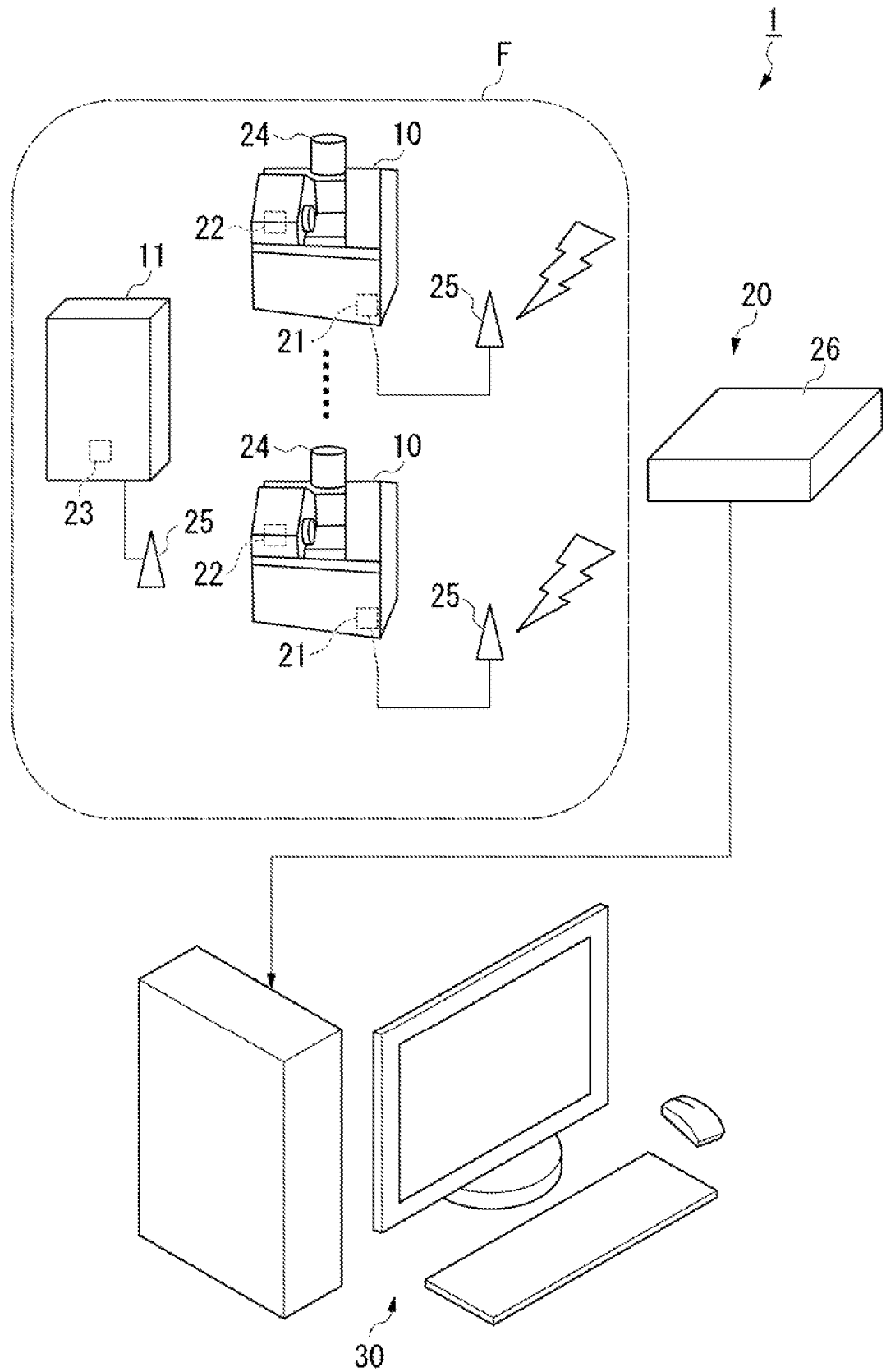
FIG. 1 is a schematic diagram illustrating a configuration of a factory evaluation system according to a first embodiment.

FIG. 1 is a schematic diagram illustrating a configuration of a factory evaluation system according to a first embodiment.

A factory evaluation system 1 includes a plurality of production facilities 10, a measurement system 20, and a factory evaluation device 30.

The production facilities 10 are installed in a factory F and are driven with power to perform various processes in response to operations of operators. The production facilities 10 can process various products (workpieces).

The measurement system 20 measures a plurality of kinds of data (for example, current values, voltages, power amounts, vibrations) regarding running of the production facilities 10. Data regarding the running of the production facility 10 is an example of data related to an operation of a factory. The following configuration of the measurement system 20 can be exemplified. The measurement system 20 includes first sensors 21, second sensors 22, third sensors 23, defective product inspection devices 24, transmitters 25, and a receiver 26. The first sensor 21 measures whether the production facility 10 is in a state corresponding to a loading time or not. For example, the first sensor 21 measures power supplied to the production facility 10 and specifies a time at which the production facility 10 is powered on as the loading time. The second sensor 22 measures whether the production facility 10 is in a state corresponding to a running time or not and whether the production facility 10 is in a state corresponding to a net running time or not. For example, the second sensor 22 measures vibration of a processing unit of the production facility 10, specifies a time in which the processing unit is running as a running time, and specifies a time in which the processing unit is processing a work as the net running time. The third sensor 23 measures a current of a non-production facility 11 (for example, an air conditioning facility or the like) in the factory F.

The defective product inspection device 24 is a device that determines whether a product produced by the production facility 10 is defective or not. For example, the defective product inspection device 24 includes an imaging device and a computer. The imaging device images a product produced by the production facility 10, and the computer performs a pattern matching process on the captured image to detect a product and determine quality of the product. The defective product inspection device 24 outputs the number of non-detective products and the number of detective products per unit time.

The transmitter 25 and the receiver 26 are connected to each other through wireless communication. The wireless communication is communication independent from wireless communication used in the factory F. Therefore, the wireless communication by the measurement system 20 does not interfere in a wireless communication environment of the factory F. The transmitter 25 is installed near the first sensor 21 and is connected to the first sensor 21, the second sensor 22, the third sensor 23, and the defective product inspection device 24 in a wired manner. The transmitter 25 transmits the data related to the production facility 10 measured by the first sensor 21 and the second sensor 22, the current value of the non-production facility 11 measured by the third sensor 23, and the number of non-detective products and the number of detective products detected by the defective product inspection device 24 to the receiver 26 through the wireless communication. The receiver 26 records the data related to each production facility 10, the current value of each non-production facility 11, and the number of non-detective products and the number of detective products received from the transmitter 25 as time-series data. The factory evaluation device 30 can acquire such time-series data recorded in the receiver 26. The configuration of the measurement system 20 is not limited thereto.

The factory evaluation device 30 outputs an overall evaluation value which is an evaluation value in view of production efficiencies and energy efficiencies of the production facilities 10 based on a plurality of kinds of time-series data related to the plurality of production facilities 10 input from the measurement system 20. In the first embodiment, a prediction result of transition of past overall evaluation values and future overall evaluation values of the factory F is displayed as a graph in response to an instruction from a user.

Configuration of Factory Evaluation Device

Figure 2:
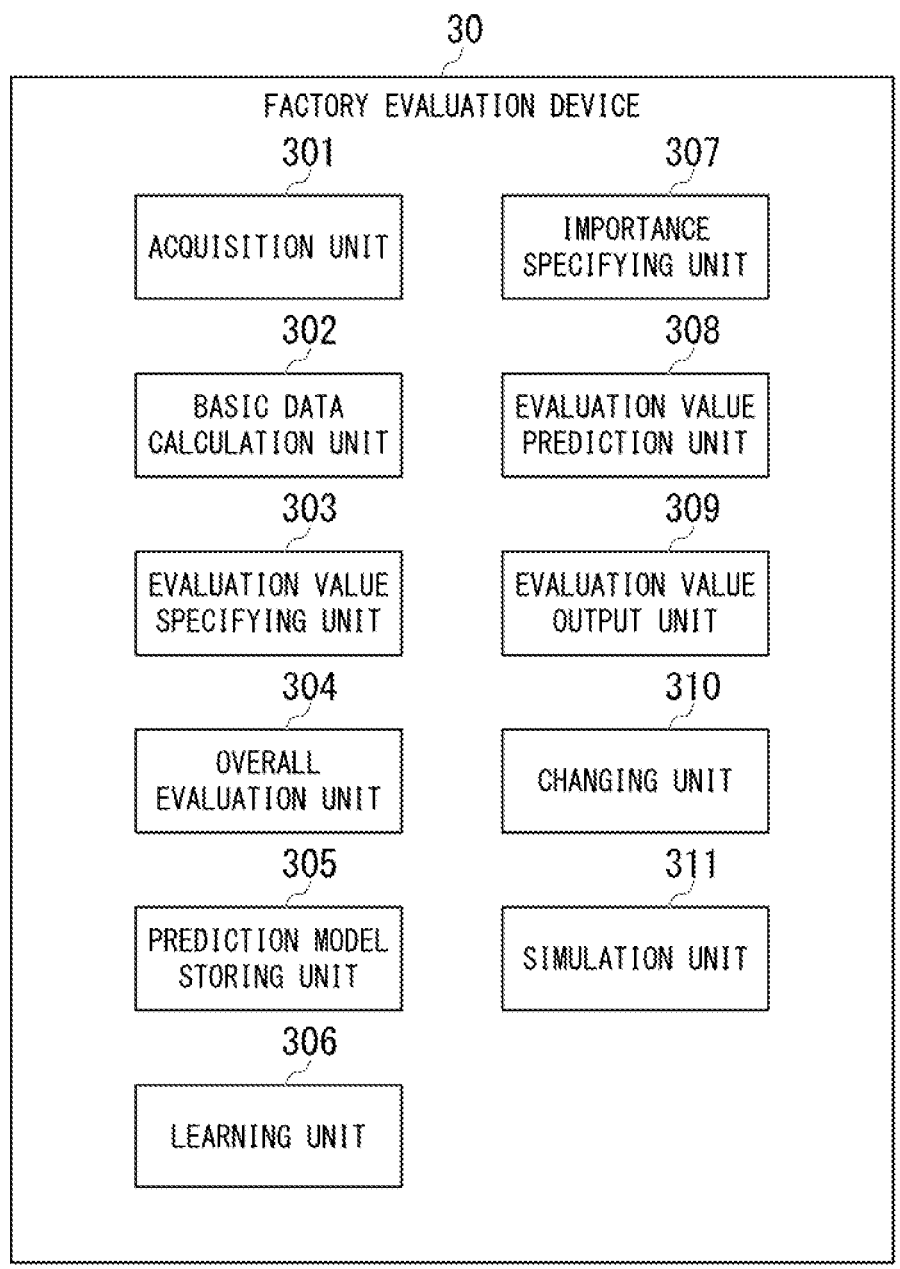
FIG. 2 is a schematic block diagram illustrating a configuration of the factory evaluation device according to the first embodiment.

FIG. 2 is a schematic block diagram illustrating a configuration of the factory evaluation device according to the first embodiment.

The factory evaluation device 30 includes an acquisition unit 301, a basic data calculation unit 302, an evaluation value specifying unit 303, an overall evaluation unit 304, a prediction model storing unit 305, a learning unit 306, an importance specifying unit 307, an evaluation value prediction unit 308, an evaluation value output unit 309, a changing unit 310, and a simulation unit 311.

The acquisition unit 301 acquires the time-series data related to each production facility 10, the current value of each non-production facility 11, and the number of non-detective products and the number of detective products from the measurement system 20. The data acquired by the acquisition unit 301 is an example of a plurality of kinds of data related to the operation of the factory. Hereinafter, the data acquired by the acquisition unit 301 is also referred to as factory measurement data. The factory measurement data may be data that further includes other data such as temperature or humidity related to the operation of the factory.

The basic data calculation unit 302 calculates the loading time, the running time, the net running time, and a power consumption amount of each production facility 10 based on the time-series factory measurement data acquired by the acquisition unit 301. The basic data calculation unit 302 calculates a production amount and the number of non-defective products of each production facility 10 in the loading time based on the time-series data related to the number of non-defective products and the number of defective products.

For example, the basic data calculation unit 302 calculates the power consumption amount of each production facility 10 based on the current value of each production facility 10 during a period of time which is a calculation target. For example, the basic data calculation unit 302 calculates a power consumption amount of each non-production facility 11 based on the current value of the non-production facility 11 during a period of time which is a calculation target.

Since a running ratio of the production facility 10 is a value obtained by dividing the running time by the loading time, the running time of the production facility 10 is an example of an amount related to the running ratio of the production facility 10.

Since an efficiency of the production facility 10 is a value obtained by dividing the net running time by the running time, the net running time of the production facility 10 is an example of an amount related to the efficiency of the production facility 10.

The evaluation value specifying unit 303 calculates an overall facility efficiency and an energy basic unit based on the loading time, the running time, the net running time, the number of products, the number of non-defective products, and the power consumption calculated by the basic data calculation unit 302. The overall facility efficiency is an example of a running ratio evaluation value related to a running ratio of the factory F. The energy basic unit is an example of an energy evaluation value related to energy consumption of the factory F.

Specifically, the evaluation value specifying unit 303 calculates the overall facility efficiency and the energy basic unit in the following order. The evaluation value specifying unit 303 calculates the running ratio of each production facility 10 by dividing the running time by the loading time. The evaluation value specifying unit 303 calculates the efficiency of each production facility 10 by dividing the net running time by the running time. The evaluation value specifying unit 303 calculates quality of each production facility 10 by dividing the number of non-defective products by the number of products. The evaluation value specifying unit 303 calculates the overall facility efficiency of each production facility 10 by multiplying the running ratio, the efficiency, and the quality. The evaluation value specifying unit 303 calculates the energy basic unit of each production facility 10 by dividing the power consumption amount by the number of products.

The evaluation value specifying unit 303 calculates an energy basic unit of the entire factory F by dividing a sum of the power consumption amounts of all the production facilities 10 and all the non-production facilities 11 by a sum of the numbers of products of all the production facilities 10. That is, the evaluation value specifying unit 303 calculates the energy basic unit of the entire factory F by dividing the current value consumed in the factory F by the number of products in the factory F.

The overall evaluation unit 304 calculates the overall evaluation value related to the operation of the factory F based on the overall facility efficiency and the energy basic unit. The overall evaluation unit 304 calculates the overall evaluation value of the entire factory by dividing an average value of the overall facility efficiency of each production facility 10 by the energy basic unit of the entire factory F. The overall evaluation value is higher as energy consumption is low. The overall evaluation value is higher as the running ratio is higher. According to another embodiment, the overall evaluation value may be lower as the energy consumption is lower, and may be lower as the running ratio is higher. For example, according to said another embodiment, the overall evaluation value may be a value obtained by dividing the energy basic unit of the entire factory F by the average value of the overall facility efficiency of each production facility 10.

The prediction model storing unit 305 stores a prediction model which is a learned model learned so that the overall facility efficiency and the energy basic unit at a time point after a given time (for example, after one week) passes from one time point are output by inputting factory measurement data at the one time point. In the embodiment, the "learned model" is a combination of a machine learning model and learned parameters. Examples of the machine learning model include a neural network, a Bayesian network, a linear regression, or a regression tree.

The learning unit 306 learns the prediction model based on the factory measurement data acquired by the acquisition unit 301. Specifically, the learning unit 306 learns the prediction model using a learning data set in which past factory measurement data serves as an input sample and the overall facility efficiency and the energy basic unit related to the input sample after the given time passes serve as an output sample. The learned prediction model is recorded in the prediction model storing unit 305. The learning unit 306 may be provided in a separate device from the factory evaluation device 30. In this case, a learned model which is learned in the separate device is recorded in the prediction model storing unit 305.

The importance specifying unit 307 specifies importance by a kind of input data in the prediction model stored by the prediction model storing unit 305. The importance is a value indicating that each of a plurality of kinds of data input to the prediction model has the degree of contribution to performance of the prediction model. The importance specifying unit 307 can specify importance in accordance with, for example, a scheme such as permutation importance. The permutation importance is a scheme of specifying a demand of evaluation target data by observing a change in an output at the time of inputting of a value shuffled from a value of evaluation target data of the importance in the data set to the prediction model and a change in an output at the time of inputting of a changed data set to the prediction model. The shuffling of the values of the data is performed for a purpose of eliminating correlation of the evaluation target data.

When the prediction model is a regression tree, the importance specifying unit 307 may specify variable importance of a decision tree as the importance.

The evaluation value prediction unit 308 predicts the overall facility efficiency and the energy basic unit at a time point after the given time passes from an evaluation time by inputting the factory measurement data related to the evaluation time acquired by the acquisition unit 301 to the prediction model stored by the prediction model storing unit 305.

The evaluation value output unit 309 outputs the overall evaluation value of the entire factory F calculated based on the overall facility efficiency and the energy basic unit specified by the evaluation value specifying unit 303, and outputs the overall evaluation value of the entire factory F calculated based on the overall facility efficiency and the energy basic unit predicted by the evaluation value prediction unit 308. Hereinafter, the overall evaluation value of the entire factory F calculated based on the overall facility efficiency and the energy basic unit specified by the evaluation value specifying unit 303 is also referred to as an overall achievement evaluation value. The overall evaluation value of the entire factory F calculated based on the overall facility efficiency and the energy basic unit predicted by the evaluation value prediction unit 308 is also referred to as an overall prediction evaluation value.

The changing unit 310 accepts a change in part of the factory measurement data related to the evaluation time acquired by the acquisition unit 301.

The simulation unit 311 predicts the overall facility efficiency and the energy basic unit after a change in a driving plan by inputting the factory measurement data changed by the changing unit 310 to the prediction model stored by the prediction model storing unit 305. The overall facility efficiency and the energy basic unit after the change in the driving plan are examples of changed evaluation values.

Operation of Factory Evaluation Device

Figure 3:
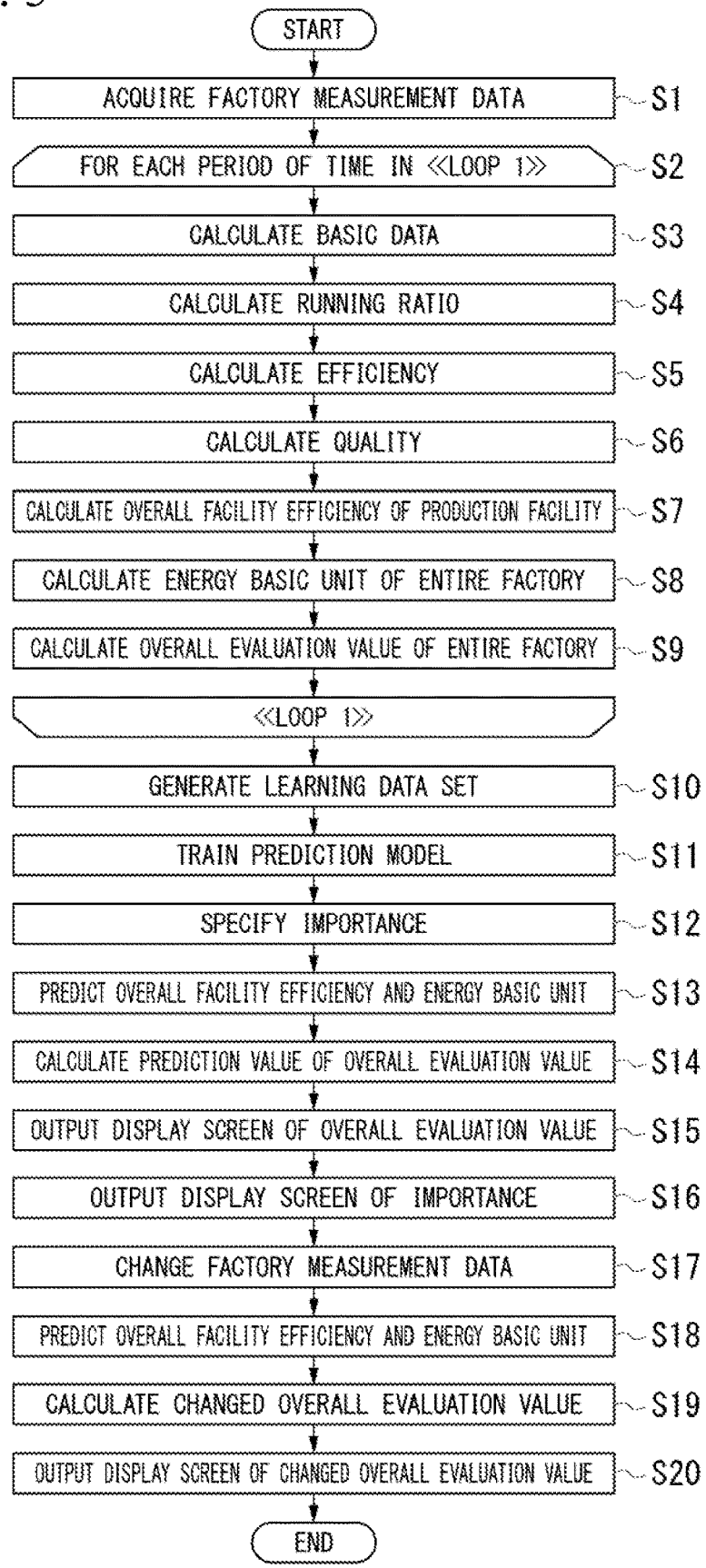
FIG. 3 is a flowchart illustrating an operation of the factory evaluation device according to the first embodiment.

FIG. 3 is a flowchart illustrating an operation of the factory evaluation device according to the first embodiment.

When the user inputs an instruction to the factory evaluation device 30 to output the overall evaluation value, the acquisition unit 301 acquires the factory measurement data from the measurement system 20 (step S1).

The factory evaluation device 30 selects one period of time per unit time (for example, one hour) which is an overall evaluation value calculation target and performs a process from the following steps S3 to S15 regarding the selected period of time (step S2).

The basic data calculation unit 302 first calculates the loading time, the running time, the net running time, the power consumption amount, the number of non-defective products, and the number of products during the selected period of time based on the information acquired by the acquisition unit 301 (step S3). Subsequently, the evaluation value specifying unit 303 calculates the running ratio of each production facility 10 during the selected period of time by dividing the running time by the loading time in the data calculated by the basic data calculation unit 302 (step S4). The evaluation value specifying unit 303 calculates the efficiency of each production facility 10 during the selected period of time by dividing the net running time by the running time (step S5). The evaluation value specifying unit 303 calculates the quality of each production facility 10 during the selected period of time by dividing the number of non-defective products by the number of productions (step S6).

The evaluation value specifying unit 303 calculates the overall facility efficiency of each production facility 10 during the selected period of time by multiplying the running ratio, the efficiency, and the quality (step S7). The evaluation value specifying unit 303 calculates the energy basic unit of the entire factory F by dividing the sum of the power consumption amounts of all the production facilities 10 and the power consumption amounts of all the non-production facilities 11 by the sum of the number of products of all the production facilities 10 (step S8). The overall evaluation unit 304 calculates the overall evaluation value of the entire factory by dividing the average value of the overall facility efficiency of each production facility 10 by the energy basic unit of the entire factory F (step S9).

When the overall facility efficiency and the energy basic unit related to each period of time are obtained through the foregoing processes, the learning unit 306 generates a learning data set which is used to learn the prediction model based on the time-series factory measurement data acquired in step S1 and the time-series overall facility efficiencies and the energy basic units generated from steps S2 to S9 (step S10). That is, the learning unit 306 generates the learning data set by shifting the factory measurement data serving as an input sample and the overall facility efficiency and the energy basic unit serving as an output sample by a given time in association. The learning unit 306 learns the prediction model using the generated learning data set (step S11). The learning may be performed through batch learning or online learning. The importance specifying unit 307 specifies the importance by the kinds of the factory measurement data using the prediction model learned in step S11 (step S12).

Subsequently, the evaluation value prediction unit 308 predicts the time-series overall facility efficiencies and the energy basic units from the present time to a time point after the given time passes by extracting the factory measurement data associated with a latest given time (for example, one week) passes among the factory measurement data acquired in step S1 at each unit time and inputting each of the extracted factory measurement data to the prediction model (step S13). The overall evaluation unit 304 calculates the time-series prediction values of the overall evaluation value from the present time to the time point after the given time passes based on the overall facility efficiency and the energy basic unit at each unit time predicted in step S13 (step S14).

Figure 4:
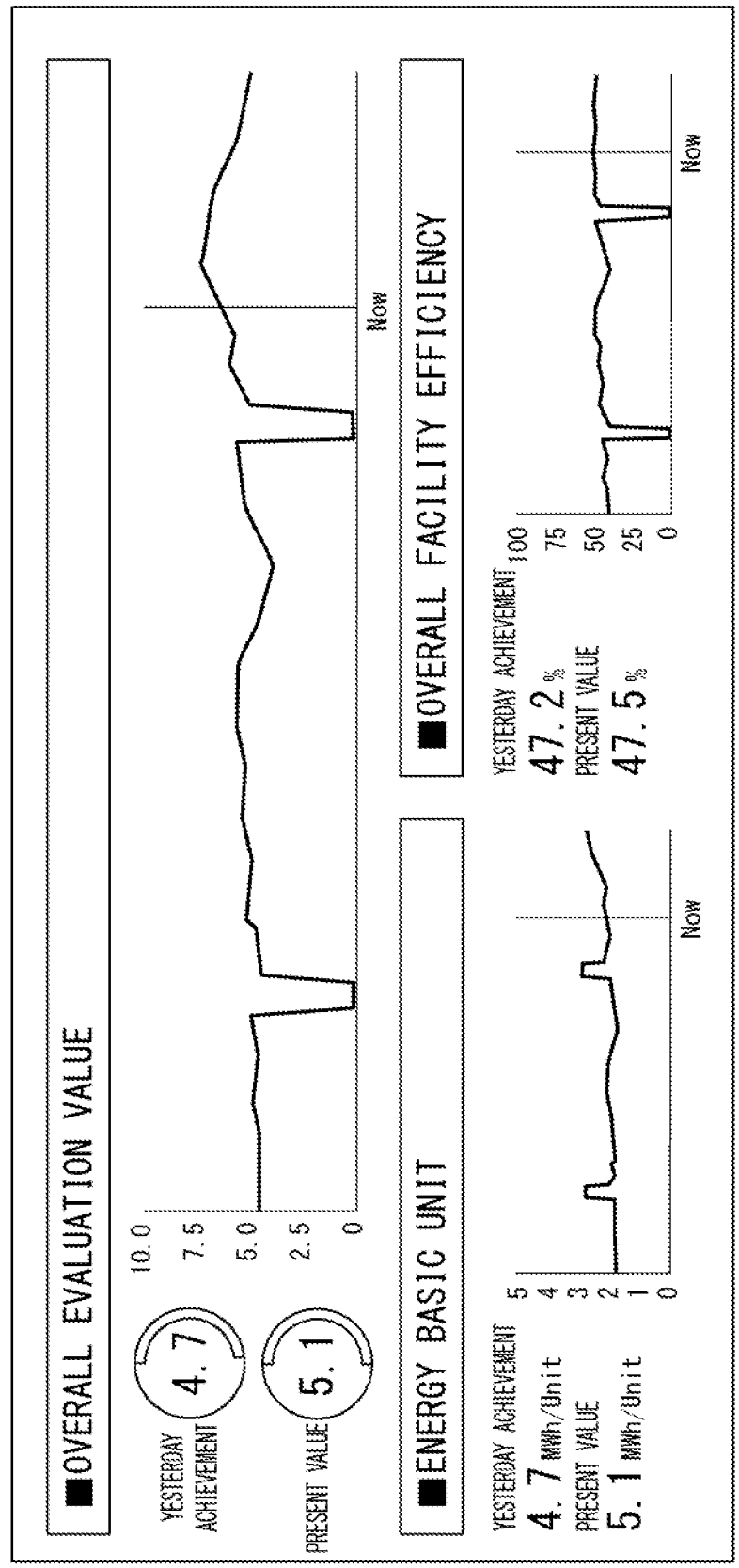
FIG. 4 is a diagram illustrating an example of a display screen of an overall evaluation value of an entire factory according to the first embodiment.

FIG. 4 is a diagram illustrating an example of a display screen of the overall evaluation values of the entire factory according to the first embodiment.

The evaluation value output unit 309 generates and outputs a display screen of the overall evaluation values illustrated in FIG. 4 (step S15).

The display screen of the overall evaluation values of the entire factory F includes a graph indicating a time-series overall evaluation values of the entire factory F, a graph indicating a time-series energy basic units of the entire factory F, and a graph indicating a time-series overall facility efficiencies of the entire factory F. The graph indicating the time-series overall evaluation values is a graph in which the vertical axis represents an overall evaluation value and the horizontal axis represents a time. The graph indicating the time-series energy basic units is a graph in which the vertical axis represents the energy basic unit and the horizontal axis represents a time. The graph indicating time-series overall facility efficiency is a graph in which the vertical axis represents the overall facility efficiency and the horizontal axis represents a time. In each graph, left evaluation values with respect to the present time are values obtained through the process from steps S2 to S9. Right evaluation values with respect to the present time are values obtained through the process of step S14.

Thus, the user can look past transition and future prediction values of the overall evaluation value. Accordingly, the user can take a countermeasure when the prediction value of the overall evaluation value is predicted to deviate from a plan value.

The user can view the graph indicating the time-series energy basic units and the graph indicating the time-series overall facility efficiencies, and thus can easily recognize whether a reason that the overall evaluation value is high or low is in production efficiency or energy efficiency.

Figure 5:
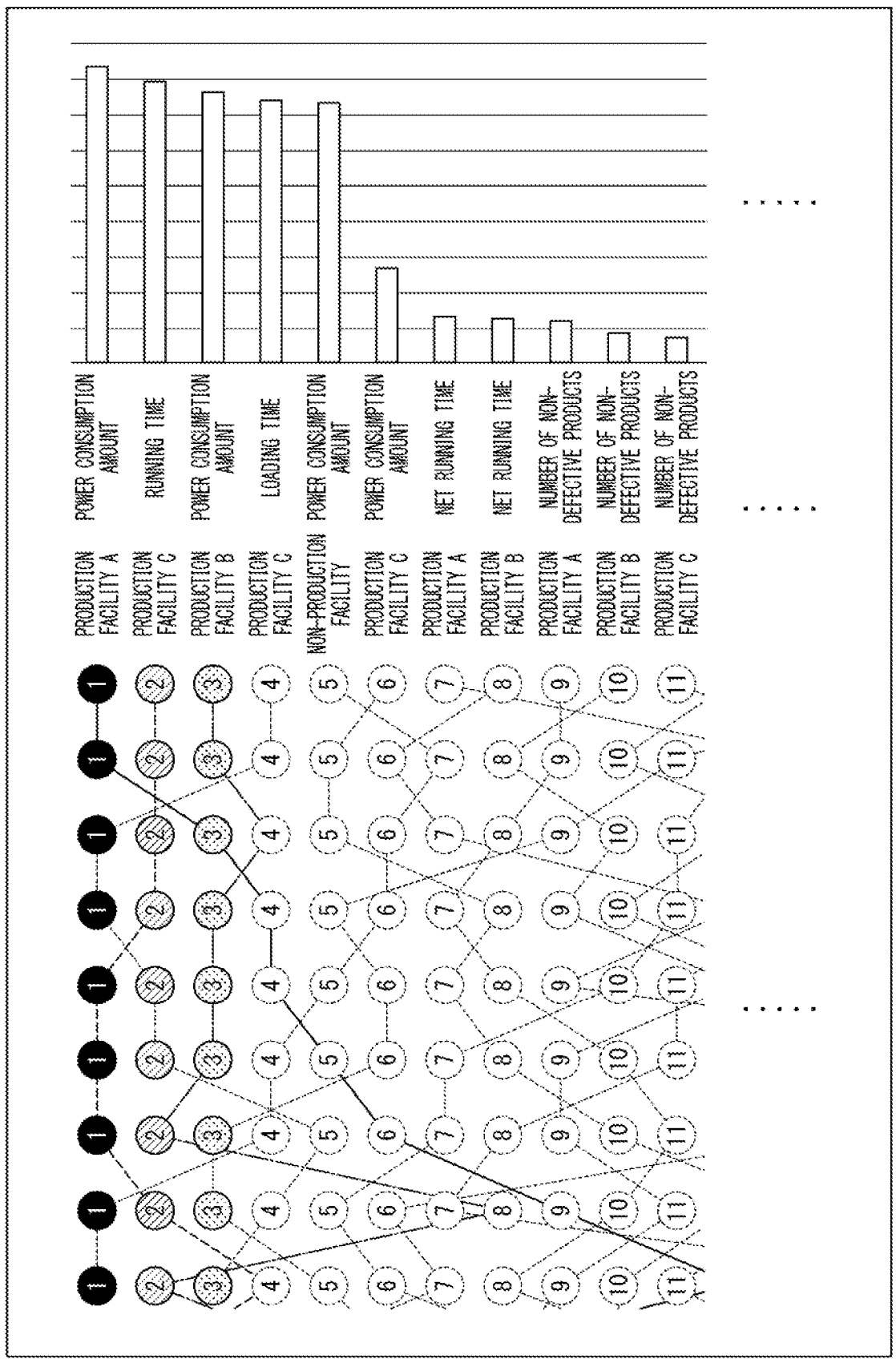
FIG. 5 is a diagram illustrating an example of a display screen of importance of factory measurement data according to the first embodiment.

FIG. 5 is a diagram illustrating an example of a display screen of importance of the factory measurement data according to the first embodiment.

The evaluation value output unit 309 generates and outputs a display screen of the importance of the factory measurement data illustrated in FIG. 5 (step S16). In the display screen of the importance, items of the factory measurement data are arranged and displayed in a descending order of the importance. In each item, a graph indicating the magnitude of the importance and a time-series importance rank for each past learning are displayed in association.

Thus, the user can review the driving plan of the factory F and refer to the display screen of the importance of the factory measurement data to usefully decide items to be reviewed. For example, since an item of which importance is greater has a larger influence on the overall evaluation value, it is also conceivable to achieve an improvement in the item of which the importance is greater. The user can observe transition of a factory state by observing a change in the present rank of the importance.

The user can perform simulation after the change in the driving plan of the factory F after viewing the display screen of the importance of the factory measurement data. That is, the user can change a present value of the factory measurement data and predict the evaluation value using the prediction model based on the changed value of the factory measurement data. The changing unit 310 accepts the change in the value of the factory measurement data acquired in step S1 from the user (step S17). The simulation unit 311 predicts the time-series overall facility efficiencies and the time-series energy basic units at a time point after the given time passes by inputting the changed factory measurement data to the prediction model (step S18). The overall evaluation unit 304 calculates the changed overall evaluation value based on the overall facility efficiency and the energy basic unit at each unit time predicted in step S18 (step S19).

Figure 6:
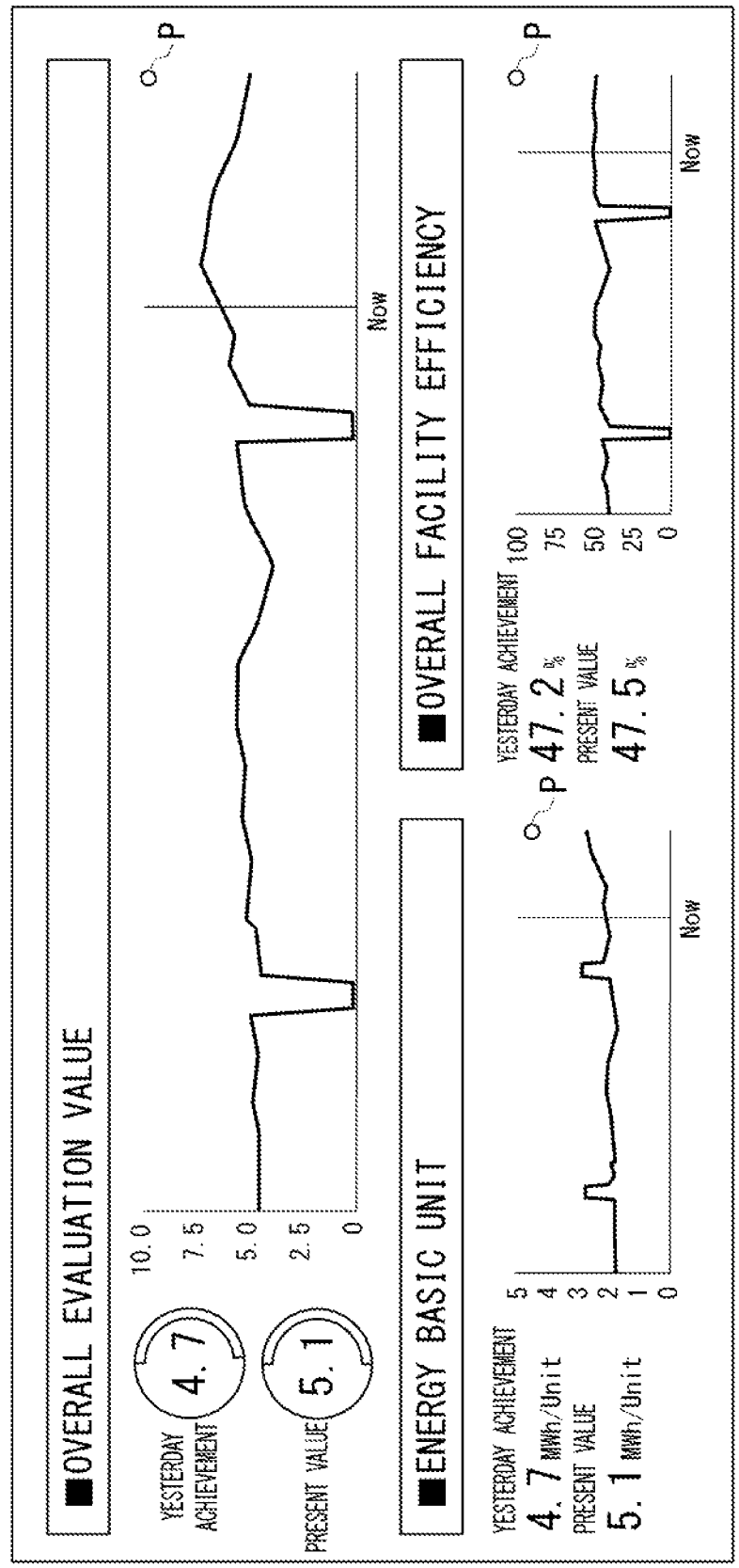
FIG. 6 is a diagram illustrating an example of a display screen of a changed overall evaluation value according to the first embodiment.

FIG. 6 is a diagram illustrating an example of a display screen of the changed overall evaluation value according to the first embodiment.

The evaluation value output unit 309 generates and outputs a display screen of the changed overall evaluation value illustrated in FIG. 6 (step S20). The display screen of the changed overall evaluation value is a screen in which a plot P of the changed overall evaluation value is added to the display screen of the overall evaluation value illustrated in FIG. 4. Thus, the user can verify validity of the change in the driving plan.

Operational Effects

In this way, according to the first embodiment, the factory evaluation device 30 predicts and outputs the evaluation value at a time point after the given time passes from the evaluation time based on the factory measurement data at the evaluation time using the prediction model. Thus, the factory evaluation device 30 can predict the evaluation value (KPI) related to a future operation when the factory F is operated.

Figure 7:
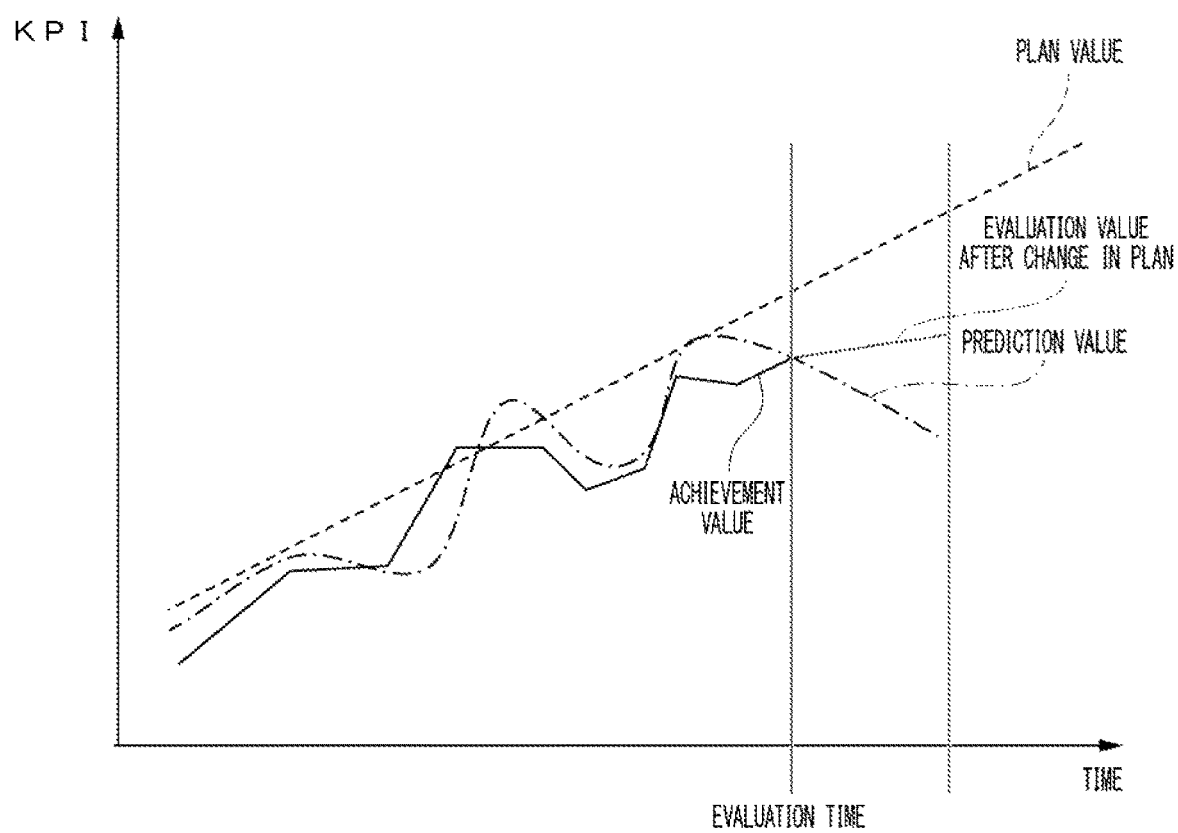
FIG. 7 is a diagram illustrating an example of restoration of an operation plan using a factory evaluation device according to the first embodiment.

FIG. 7 is a diagram illustrating an example of restoration of an operation plan in which the factory evaluation device is used according to the first embodiment. For example, as illustrated in FIG. 7, in a case where the factory evaluation device 30 generates a display screen indicating that the KPI is considerably lowered at an evaluation time point after a given time passes, the user of the factory evaluation device 30 can know, before a deviation occurs between a plan value and an achievement value of the KPI or at a time point at which a minute deviation occurs, that deviation is going to occur in the future. Thus, the user can choose a countermeasure and advanced or early restoration of an operation plan can be performed.

According 10 the first embodiment, the factory measurement data includes data related to the running ratio of the facility of the factory F and the data related to the energy consumption of the facility. Thus, the factory measurement data for calculating the evaluation value can be obtained in conformity with a cheap and general scheme. In another embodiment, the present invention is not limited thereto. The evaluation value may be calculated using a plurality of kinds of data related to an operation of the factory F by manpower.

Figure 8:
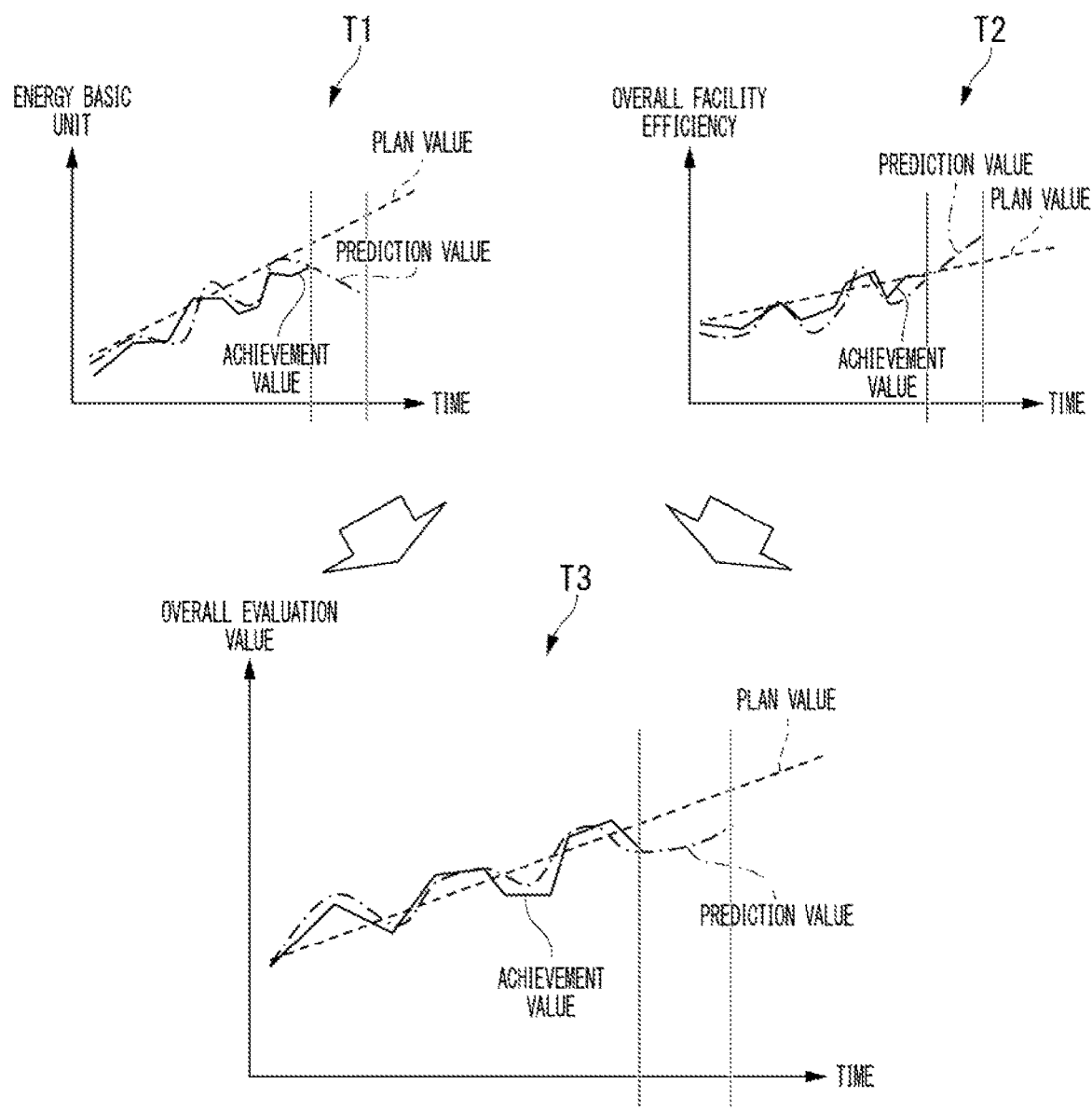
FIG. 8 is a diagram illustrating an example in which the overall evaluation value is obtained based on an energy basic unit and an overall facility efficiency.

According to the first embodiment, the prediction model outputs the energy basic unit which is an energy evaluation value related to the energy consumption of the factory F and the overall facility efficiency which is a running ratio evaluation value related to the running ratio of the factory F as the evaluation values. The factory evaluation device 30 calculates the overall evaluation value from the predicted energy basic unit and overall facility efficiency. FIG. 8 is a diagram illustrating an example in which the overall evaluation values are obtained from the energy basic units and the overall facility efficiencies. Thus, the factory evaluation device 30 can realize prediction for aiming overall optimization with reference to a time-series overall evaluation value T3, as illustrated in FIG. 8, rather than prediction for individual optimization of only the energy basic unit or the overall facility efficiency. The user recognizes a time-series energy basic unit T1 and a time-series overall facility efficiency T2, and thus can easily recognize whether a cause of the change is the prediction of the overall evaluation value is in the production efficiency or the energy efficiency. In the other embodiment, the present invention is not limited thereto. The prediction model may be a model that directly outputs the overall evaluation value or other evaluation values.

The factory evaluation device 30 specifies the importance by the kinds of factory measurement data in the prediction model and outputs the importance. Thus, the user can review the driving plan of the factory F and refer to the display screen of the importance of the factory measurement data to usefully decide items to be reviewed. The factory evaluation device 30 specifies the importance at each updating of the prediction model and outputs the time-series importance. Thus, the user can observe the transition of the state of the factory F by observing the change in the present rank of the importance. In the other embodiment, the present invention is not limited thereto. The factory evaluation device 30 may not calculate the importance or may output only the latest importance.

The factory evaluation device 30 accepts the change in the value of the factory measurement data and predicts a changed evaluation value based on the changed data. Thus, the user can verify validity of the change in the driving plan. In the other embodiment, the present invention is not limited thereto. The factory evaluation device 30 may not accept the change in the value of the factory measurement data.

Other Embodiments

The embodiment has been described in detail with reference to the drawings, but a specific configuration is not limited to the above-described configuration and various design changes can be made.

For example, in the other embodiments, the order of the above-described processes may be appropriately changed. Some of the processes may be performed in parallel.

The factory evaluation device 30 according to the above-described embodiment calculates the energy basic unit, the overall facility efficiency, and the overall evaluation value as the evaluation values related to the operation of the factory F, but the present invention is not limited thereto, for example, the factory evaluation device 30 according to other embodiments may calculate only the energy basic unit or the overall facility efficiency or may calculate other evaluation values.

In the above-described embodiment, the factory evaluation device 30 predicting the evaluation values for the operation of the factory has been described, but the present invention is not limited thereto. For example, in another embodiment, the evaluation values may be predicted in conformity with a similar scheme to that of company management. In this case, a received order, sales, or the like can be used as an evaluation value.

Configuration Configuration

Figure 9:
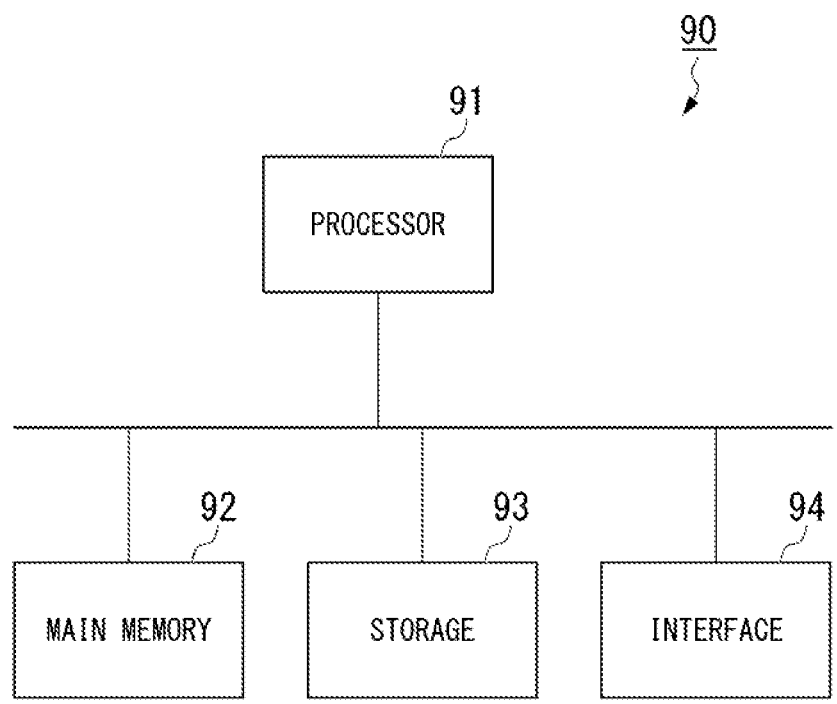
FIG. 9 is a schematic block diagram illustrating a configuration of a computer according to at least one embodiment.

FIG. 9 is a schematic block diagram illustrating a configuration of a computer according to at least one embodiment.

A computer 90 includes a processor 91, a main memory 92, a storage 93, and an interface 94.

The above-described factory evaluation device 30 is mounted on the computer 90. The operations of the above-described processing units are stored in the storage 93 in a program formal. The processor 91 reads a program from the storage 93 and loads the program in the main memory 92, and then executes the foregoing processes in accordance with the program. The processor 91 guarantees a storage region corresponding to the above-described prediction model storing unit 305 in the main memory 92 in accordance with the program.

The program may be a program that realizes parts of the functions executed by the computer 90. For example, the program may be a program that executes the functions in combination with another program stored in advance in the storage 93 and in combination with another program mounted on another device. In another embodiment, the computer 90 may include a customed large scale integrated circuit (LSI) such as a programmable logic device (PLD) in addition to or instead of the foregoing configuration. Examples of the PLD includes a programmable array logic (PAL), a generic array logic (GAL), a complex programmable logic device (CPLD), and a field programmable gate array (FPGA). In this case, some or all of the functions realized by the processor 91 may be realized by the integrated circuit.

Examples of the storage 93 includes a magnetic disc, a magneto-optical disc, and a semiconductor memory. The storage 93 may be an internal device directly connected to a bus of the computer 90 or may be an external medium connected to the computer 90 via the interface 94 or a communication line. When the program is delivered to the computer 90 via the communication line, the computer 90 to which the program is delivered may load the program in the main memory 92 and perform the forgoing processes. According to at least one embodiment, the storage 93 is a non-transitory storage medium.

The program may be a program that realizes some of the above-described functions. Further, the program may be a so-called a difference file (a difference program) that realizes the above-described functions in combination with another program stored in advance in the storage 93.

INDUSTRIAL APPLICABILITY

According to the disclosure of the present specification, a factory evaluation device can predict an evaluation value related to a future operation of a factory.

REFERENCE SIGNS LIST

1 Factory evaluation system
10 Production facility
20 Measurement system
30 Factory evaluation device
301 Acquisition unit
302 Basic data calculation unit
303 Evaluation value specifying unit
305 Prediction model storage unit
306 Learning unit
307 Importance specifying unit
308 Evaluation value prediction unit
304 Overall evaluation unit
309 Evaluation value output unit
310 Changing unit
311 Simulation unit

The invention claimed is:

1. An operation evaluation device comprising:
an acquisition unit configured to acquire a plurality of kinds of data related to the operation of a factory;
an evaluation value prediction unit configured to predict an evaluation value related to an operation of the factory at a time point after a given time passes from a predetermined evaluation time based on input data related to the operation of the factory at the evaluation time using a prediction model which is a learned model learned so that the evaluation value at a time point after the given time passes from one time point is output by inputting the plurality of kinds of data related to the operation of the factory at the one timepoint; and an evaluation value output unit configured to output information related to the evaluation value,
wherein the prediction model outputs, as the evaluation value, an energy evaluation value related to energy consumption of the factory and a running ratio evaluation value related to a running ratio of the factory,
the operation evaluation device, further comprising:
an importance specifying unit configured to specify importance by a kind of the input data in the prediction model;
wherein the evaluation value output unit outputs the importance by the kind of input data;

wherein the importance specifying unit specifies the importance in a case where the prediction model is updated;

wherein the evaluation value output unit outputs time-series importance by the kind of input data;

a changing unit configured to accept a change in a value of the input data from a user based on the importance by the kind of input data outputted by the evaluation value output unit; and a simulation unit configured to predict a changed evaluation value which is the evaluation value at the time point after the given time passes from the evaluation time based on the changed data using the prediction model, wherein the factory is operated based on the changed evaluation value.

2. The operation evaluation device according to claim 1, wherein the input data includes data related to a running ratio of a facility of the factory and energy consumption of the facility.

3. The operation evaluation device according to claim 1, further comprising:

an overall evaluation unit configured to, based on the energy evaluation value and the running ratio evaluation value, calculate an overall evaluation value that is higher as the energy consumption is lower and is higher as the running ratio is higher, or is lower as the energy consumption is lower and is lower as the running ratio is higher, wherein the evaluation value output unit outputs the energy evaluation value, the running ratio evaluation value, and the overall evaluation value.

4. An operation evaluation method comprising:

acquiring a plurality of kinds of data related to the operation of a factory;

predicting an evaluation value related to an operation of the factory at a time point after a given time passes from a predetermined evaluation time based on input data related to the operation of the factory at the evaluation time using a prediction model which is a learned model learned so that the evaluation value at a time point after the given time passes from one time point is output by inputting the plurality of kinds of data related to the operation of the factory at one time point; and outputting information related to the evaluation value, wherein the prediction model outputs, as the evaluation value, an energy evaluation value related to energy consumption of the factory and a running ratio evaluation value related to a running ratio of the factory, the operation evaluation method, further comprising:

specifying importance by a kind of the input data in the prediction model;

outputting the importance by the kind of input data;

specifying the importance in a case where the prediction model is updated;

outputting time-series importance by the kind of input data;

accepting a change in a value of the input data from a user based on the importance by the kind of input data outputted;

predicting a changed evaluation value which is the evaluation value at the time point after the given time passes from the evaluation time based on the changed data using the prediction model; and wherein the factory is operated based on the changed evaluation value.

5. A non-transitory computer-readable storage medium storing a program for causing a computer to execute processing comprising the steps of:

acquiring a plurality of kinds of data related to the operation of a factory;

predicting an evaluation value related to an operation of the factory at a time point after a given time passes from a predetermined evaluation time based on input data related to the operation of the factory at the evaluation time using a prediction model which is a learned model learned so that the evaluation value at a time point after the given time passes from one time point is output by inputting the plurality of kinds of data related to the operation of the factory at one time point; and outputting information related to the evaluation value, wherein the prediction model outputs, as the evaluation value, an energy evaluation value related to energy consumption of the factory and a running ratio evaluation value related to a running ratio of the factory, the computer further executing processing, comprising:

specifying importance by a kind of the input data in the prediction model;

outputting the importance by the kind of input data;

specifying the importance in a case where the prediction model is updated;

outputting time-series importance by the kind of input data;

accepting a change in a value of the input data from a user based on the importance by the kind of input data outputted;

predicting a changed evaluation value which is the evaluation value at the time point after the given time passes from the evaluation time based on the changed data using the prediction model; and wherein the factory is operated based on the changed evaluation value.

* * * * *